(12) United States Patent
Reid et al.

(10) Patent No.: US 10,923,691 B2
(45) Date of Patent: Feb. 16, 2021

(54) SEALED PACKAGES FOR ELECTRONIC AND ENERGY STORAGE DEVICES

(71) Applicant: Concept Group, LLC, Wellesley, MA (US)

(72) Inventors: Aarne H Reid, Jupiter, FL (US); Michael Cline Murray, Jupiter, FL (US)

(73) Assignee: Concept Group, LLC, Wellesley, MA (US)

( * ) Notice: Subject to any disclaimer, the term of this patent is extended or adjusted under 35 U.S.C. 154(b) by 0 days.

(21) Appl. No.: 16/699,802

(22) Filed: Dec. 2, 2019

(65) Prior Publication Data

US 2020/0106059 A1 Apr. 2, 2020

Related U.S. Application Data

(62) Division of application No. 15/238,961, filed on Aug. 17, 2016, now Pat. No. 10,497,908.

(60) Provisional application No. 62/208,865, filed on Aug. 24, 2015.

(51) Int. Cl.
*H01M 2/02* (2006.01)
*H01M 2/04* (2006.01)

(52) U.S. Cl.
CPC ......... *H01M 2/022* (2013.01); *H01M 2/0426* (2013.01)

(58) Field of Classification Search
None
See application file for complete search history.

(56) References Cited

U.S. PATENT DOCUMENTS

| | | |
|---|---|---|
| 1,362,805 A | 12/1920 | Kruse |
| 1,457,504 A | 6/1923 | Cullen et al. |
| 2,085,737 A | 7/1937 | Cereghino |
| 2,225,660 A | 12/1940 | Rogers |
| 2,362,893 A | 11/1944 | Durst |
| 2,363,893 A | 11/1944 | Baptiste |
| 2,573,594 A | 10/1951 | Nofzinger |
| 2,666,979 A | 1/1954 | Van Dusen |
| 2,722,336 A | 11/1955 | Aaron et al. |
| 2,807,074 A | 9/1957 | Schroeder |
| 2,867,242 A | 1/1959 | Harris et al. |
| 3,119,238 A | 1/1964 | Chamberlain et al. |
| 3,146,005 A | 8/1964 | Peyton |
| 3,195,564 A | 7/1965 | Carney et al. |
| 3,265,236 A | 8/1966 | Norman et al. |
| 3,460,512 A | 8/1969 | Keichler et al. |
| 3,510,323 A | 5/1970 | Wismer et al. |
| 3,706,208 A | 12/1972 | Kadi et al. |

(Continued)

FOREIGN PATENT DOCUMENTS

| | | |
|---|---|---|
| CN | 102072363 A | 5/2011 |
| CN | 202001825 U | 10/2011 |

(Continued)

OTHER PUBLICATIONS

Daniel et al., "Handbook of Battery Materials", Wiley-VCH Publishers, 2011, vol. 1, 3 pages.

(Continued)

*Primary Examiner* — Wyatt P McConnell
(74) *Attorney, Agent, or Firm* — BakerHostetler

(57) ABSTRACT

The present disclosure provides insulated assemblies for electronics packaging, the assemblies in some embodiments including an electrical connection extending through a tube that extends through an insulating vacuum space.

20 Claims, 10 Drawing Sheets

(56) References Cited

U.S. PATENT DOCUMENTS

| | | |
|---|---|---|
| 3,736,936 A | 6/1973 | Basiulis et al. |
| 3,760,142 A | 9/1973 | Schoenthaler |
| 4,055,268 A | 10/1977 | Barthel |
| 4,117,201 A | 9/1978 | Keifert |
| 4,157,779 A | 6/1979 | Arashi et al. |
| 4,200,199 A | 4/1980 | Perkins et al. |
| 4,332,401 A | 6/1982 | Stephenson et al. |
| 4,396,211 A | 8/1983 | McStravick et al. |
| 4,399,919 A | 8/1983 | Posnansky et al. |
| 4,450,872 A | 5/1984 | Orcutt |
| 4,491,347 A | 1/1985 | Gustafson |
| 4,515,397 A | 5/1985 | Nowobilski et al. |
| 4,653,469 A | 3/1987 | Miyaji et al. |
| 4,696,104 A | 9/1987 | Vanzetti et al. |
| 4,746,054 A | 5/1988 | Moats et al. |
| 4,758,222 A | 7/1988 | McCoy |
| 4,838,859 A | 6/1989 | Strassmann |
| 4,903,631 A | 2/1990 | Morris |
| 4,919,299 A | 4/1990 | Haines |
| 4,997,124 A | 3/1991 | Kitabatake et al. |
| 5,038,706 A | 8/1991 | Morris |
| 5,052,816 A | 10/1991 | Nakamura et al. |
| 5,108,390 A | 4/1992 | Potocky et al. |
| 5,206,705 A | 4/1993 | Tokura |
| 5,235,817 A | 8/1993 | Gallagher et al. |
| 5,285,559 A | 2/1994 | Thompson et al. |
| 5,411,897 A | 5/1995 | Harvey et al. |
| 5,520,682 A | 5/1996 | Baust et al. |
| 5,524,630 A | 6/1996 | Crowley |
| 5,573,140 A | 11/1996 | Satomi et al. |
| 5,573,532 A | 11/1996 | Chang et al. |
| 5,600,752 A | 2/1997 | Lopatinsky |
| 5,650,020 A | 7/1997 | Ohta et al. |
| 5,674,218 A | 10/1997 | Rubinsky et al. |
| 5,742,048 A | 4/1998 | Kobayashi et al. |
| 5,862,973 A | 1/1999 | Wasserman |
| 5,869,801 A | 2/1999 | Paton et al. |
| 5,870,823 A | 2/1999 | Bezama et al. |
| 6,050,443 A | 4/2000 | Tung |
| 6,095,405 A | 8/2000 | Kim et al. |
| 6,109,518 A | 8/2000 | Mueller et al. |
| 6,139,571 A | 10/2000 | Fuller et al. |
| 6,145,547 A | 11/2000 | Villatte |
| 6,166,907 A | 12/2000 | Chien |
| 6,186,390 B1 | 2/2001 | Tadauchi et al. |
| 6,216,745 B1 | 4/2001 | Augustynowicz et al. |
| 6,360,935 B1 | 3/2002 | Flake |
| 6,706,037 B2 | 3/2004 | Zvuloni et al. |
| 6,755,823 B2 | 6/2004 | Lalonde |
| 6,875,209 B2 | 4/2005 | Zvuloni et al. |
| 6,936,045 B2 | 8/2005 | Yu et al. |
| 7,064,429 B2 | 6/2006 | Bemmerl et al. |
| 7,139,172 B2 | 11/2006 | Bezama et al. |
| 7,150,743 B2 | 12/2006 | Zvuloni et al. |
| 7,203,064 B2 | 4/2007 | Mongia et al. |
| 7,207,985 B2 | 4/2007 | Duong et al. |
| 7,258,161 B2 | 8/2007 | Cosley et al. |
| 7,298,623 B1 | 11/2007 | Kuczynski et al. |
| RE40,049 E | 2/2008 | Li |
| 7,334,630 B2 | 2/2008 | Goodson et al. |
| 7,354,434 B2 | 4/2008 | Zvuloni et al. |
| 7,356,434 B2 | 4/2008 | Wu et al. |
| 7,361,187 B2 | 4/2008 | Duong et al. |
| 7,374,063 B2 | 5/2008 | Reid |
| 7,393,350 B2 | 7/2008 | Maurice |
| 7,419,085 B2 | 9/2008 | Fukunaka et al. |
| 7,451,785 B2 | 11/2008 | Taira et al. |
| 7,460,369 B1 | 12/2008 | Blish, II |
| 7,485,117 B2 | 2/2009 | Damasco et al. |
| 7,497,365 B2 | 3/2009 | Kimura et al. |
| 7,510,534 B2 | 3/2009 | Burdorff et al. |
| 7,515,415 B2 | 4/2009 | Monfarad et al. |
| 7,608,071 B2 | 10/2009 | Duong et al. |
| 7,621,889 B2 | 11/2009 | Duong et al. |
| 7,621,890 B2 | 11/2009 | Duong et al. |
| 7,681,299 B2 | 3/2010 | Reid |
| 7,909,227 B2 | 3/2011 | Duong et al. |
| 7,980,171 B2 | 7/2011 | Groll |
| 8,231,613 B2 | 7/2012 | Baxter et al. |
| 8,353,332 B2 | 1/2013 | Reid |
| 8,434,665 B2 | 5/2013 | Motomura et al. |
| 9,243,726 B2 | 1/2016 | Reid |
| 9,463,918 B2 | 10/2016 | Reid |
| 9,874,303 B2 | 1/2018 | Reid |
| 2001/0030225 A1 | 10/2001 | Nagata |
| 2002/0114937 A1 | 8/2002 | Albert et al. |
| 2003/0079554 A1 | 5/2003 | Van Cleve |
| 2003/0146224 A1 | 8/2003 | Fujii et al. |
| 2004/0116851 A1 | 6/2004 | Johansen et al. |
| 2004/0129756 A1 | 7/2004 | Zakel et al. |
| 2004/0181136 A1 | 9/2004 | McDaniel et al. |
| 2004/0226979 A1 | 11/2004 | Sato et al. |
| 2005/0211711 A1 | 9/2005 | Reid |
| 2006/0054234 A1 | 3/2006 | White |
| 2006/0054243 A1 | 3/2006 | Walton |
| 2006/0061092 A1 | 3/2006 | Keyes |
| 2006/0071052 A1 | 4/2006 | Conlon et al. |
| 2006/0076389 A1 | 4/2006 | Kemper et al. |
| 2006/0086773 A1 | 4/2006 | Sanftleben et al. |
| 2006/0282039 A1 | 12/2006 | Duong et al. |
| 2007/0102477 A1 | 5/2007 | Prince |
| 2007/0102478 A1 | 5/2007 | Prince |
| 2007/0235497 A1 | 10/2007 | Hsu |
| 2007/0235498 A1 | 10/2007 | Hsu |
| 2007/0235499 A1 | 10/2007 | Hsu |
| 2007/0246510 A1 | 10/2007 | Hsu |
| 2008/0006598 A1 | 1/2008 | Fujii et al. |
| 2008/0036076 A1 | 2/2008 | Ouyang |
| 2008/0061111 A1 | 3/2008 | Kiriyama |
| 2008/0083816 A1 | 4/2008 | Leinbach et al. |
| 2008/0121642 A1 | 5/2008 | Reid |
| 2008/0147055 A1 | 6/2008 | Duong et al. |
| 2008/0169037 A1 | 7/2008 | Ziegler |
| 2008/0197170 A1 | 8/2008 | Prince |
| 2008/0285230 A1 | 11/2008 | Bojan et al. |
| 2009/0031659 A1 | 2/2009 | Kalfon |
| 2009/0065499 A1 | 3/2009 | England |
| 2009/0068070 A1 | 3/2009 | Hashimoto et al. |
| 2009/0123221 A1 | 5/2009 | Marshall |
| 2009/0152331 A1 | 6/2009 | Schmitt et al. |
| 2010/0057064 A1 | 3/2010 | Baust et al. |
| 2010/0057067 A1 | 3/2010 | Baust et al. |
| 2010/0076421 A1 | 3/2010 | Baust et al. |
| 2010/0096037 A1 | 4/2010 | Lee et al. |
| 2010/0258290 A1 | 10/2010 | Bass |
| 2011/0056582 A1 | 3/2011 | Walle et al. |
| 2011/0178514 A1 | 7/2011 | Levin et al. |
| 2011/0264084 A1 | 10/2011 | Reid |
| 2012/0085070 A1 | 4/2012 | Chou et al. |
| 2012/0090817 A1 | 4/2012 | Reid |
| 2012/0175007 A1 | 7/2012 | Pan et al. |
| 2012/0184901 A1 | 7/2012 | Nguyen et al. |
| 2012/0228364 A1 | 9/2012 | Vegelahn |
| 2012/0282792 A1 | 11/2012 | Schloegl |
| 2012/0318808 A1 | 12/2012 | McCormick |
| 2013/0105496 A1 | 5/2013 | Jung |
| 2013/0199757 A1 | 8/2013 | Meyer et al. |
| 2014/0008417 A1 | 1/2014 | Visser et al. |
| 2014/0012243 A1 | 1/2014 | Burnett et al. |
| 2014/0090737 A1 | 4/2014 | Reid |
| 2014/0177146 A1 | 6/2014 | Barizza et al. |
| 2014/0182608 A1 | 7/2014 | Egoyants et al. |
| 2014/0275767 A1 | 9/2014 | Baust |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2015/0356730 A1 | 12/2015 | Grove et al. |
| 2016/0044963 A1 | 2/2016 | Saleem |
| 2016/0084425 A1 | 3/2016 | Reid |

(56) References Cited

U.S. PATENT DOCUMENTS

| | | |
|---|---|---|
| 2016/0279725 A1 | 9/2016 | Azdasht |
| 2016/0314220 A1 | 10/2016 | Sachdev et al. |
| 2016/0317220 A1 | 11/2016 | Guo |
| 2016/0341360 A1 | 11/2016 | Uraguchi et al. |
| 2016/0354853 A1 | 12/2016 | Azdasht |
| 2016/0368072 A1 | 12/2016 | Senga et al. |
| 2017/0043938 A1 | 2/2017 | Reid |
| 2017/0062774 A1 | 3/2017 | Reid et al. |
| 2017/0106414 A1 | 4/2017 | Hamilton |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |
| 2017/0305641 A1 | 10/2017 | Bodum |
| 2017/0358079 A1 | 12/2017 | Gillies et al. |
| 2018/0106414 A1 | 4/2018 | Reid |
| 2018/0106529 A1 | 4/2018 | Cur et al. |

FOREIGN PATENT DOCUMENTS

| | | |
|---|---|---|
| DE | 10019420 A1 | 10/2001 |
| EP | 0611614 A1 | 8/1994 |
| EP | 1294022 A2 | 3/2003 |
| FR | 2550313 A1 | 2/1985 |
| GB | 2105226 A | 3/1983 |
| JP | 06-142909 A | 5/1994 |
| JP | 3654249 B2 | 6/2005 |
| JP | 2005-224832 A | 8/2005 |
| JP | 3962782 B1 | 8/2007 |
| JP | 2008-045956 A | 2/2008 |
| WO | 03/25476 A2 | 3/2003 |
| WO | 2009/068255 A1 | 6/2009 |
| WO | 2013/034455 A1 | 3/2013 |
| WO | 2015/091003 A1 | 6/2015 |
| WO | 2017/152045 A1 | 9/2017 |
| WO | 2018/093773 A1 | 5/2018 |
| WO | 2018/093776 A1 | 5/2018 |
| WO | 2018/093781 A1 | 5/2018 |
| WO | 2019/010385 A1 | 1/2019 |
| WO | 2019/014463 A1 | 1/2019 |
| WO | 2019/040885 A1 | 2/2019 |
| WO | 2020/112976 A1 | 6/2020 |

OTHER PUBLICATIONS

Database WPI Week 201179 Thomson Scientific, London, GB; AN 2011-N98729 XP002794699, & CN 202 001 825 U (LINS) Oct. 5, 2011 (Oct. 5, 2011).
Guidotti et al., "Characterization of Vacuum-Multifoil Insulation for Long-Life Thermal Batteries", U.S. Department of Energy, Office of Scientific and Technical Information, Apr. 17, 2000, 3 pages.
Hodkinson et al., "Lightweight Electric/Hybrid Vehicle Design", 2001, 4 pages.
https://en.wikipedia.org/wiki/Sodium-sulfur battery Jun. 11, 2018, 5 pages.
https://en.wikipedia.org/wiki/Sodium-sulfur_battery_June 11, 2018, 5 pages.
Multifoil Insulation; 1 page.
National Research Council, "Assessment of Research Needs for Advanced Battery Systems", 1982, 203 pages.
Overview of NAS Battery for Load Management; CEC Energy Storage Workshop, Feb. 2005, pp. 1-22.
U.S. Patent Application filed Apr. 23, 2010 by Concept Group Inc., U.S. Appl. No. 12/766,397.

SEALED PACKAGES FOR ELECTRONIC AND ENERGY STORAGE DEVICES

RELATED APPLICATION

The present application is a divisional application of now-allowed U.S. application Ser. No. 15/238,961, "Sealed Packages for Electronic and Energy Storage Devices" (filed Aug. 17, 2016, and to be issued as U.S. Pat. No. 10,497,808), which claims priority to and the benefit of U.S. application No. 62/208,865, "Sealed Packages for Electronic and Energy Storage Devices" (filed Aug. 24, 2015). The entireties of the foregoing applications are incorporated herein by reference for any and all purposes.

TECHNICAL FIELD

The present disclosure relates to the field of electronics packaging and to the field of thermally-insulated containers.

BACKGROUND

Because electronics components and energy storage devices (e.g., batteries) are sensitive to environmental conditions and temperature, such components and devices must be stored in a way that shields them from the exterior environment and that provides temperature insulation. Accordingly, there is a long-felt need in the art for packaging for components and devices that provide shielding and temperature insulation.

SUMMARY

In meeting the disclosed challenges, the present disclosure first provides a header assembly, comprising: a concave cap plug having upper and lower surfaces; a cap having upper and lower surfaces, the cap plug and the cap being sealably assembled to as to define an insulating volume within, the insulating volume being defined by an lower surface of the cap and an upper surface of the cap plug, the insulating volume being at a vacuum; at least one cap tube having a lumen, the lumen of the at least one cap tube extending through an aperture of the cap, through the insulating volume, and through an aperture of the cap plug.

The present disclosure also provides methods of constructing a header assembly, the methods comprising: disposing an electronic device within a container having an opening; affixing a header assembly so as to seal the opening against the environment exterior to the container, a volume being defined within the header assembly, the header assembly comprising a tube having a lumen, the lumen extending through the volume so as to place the interior of the container into fluid communication with the environment exterior to the container.

Further provided are methods of forming a header assembly, comprising: joining a cap and a concave cap plug so as to define a header assembly having a first surface, a second surface, and a sealed volume within; effecting a vacuum within the sealed volume; and placing at least one tube having a lumen such that the lumen extends through the sealed volume from the first surface to the second surface so as to place the first and second surfaces into fluid communication with one another.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
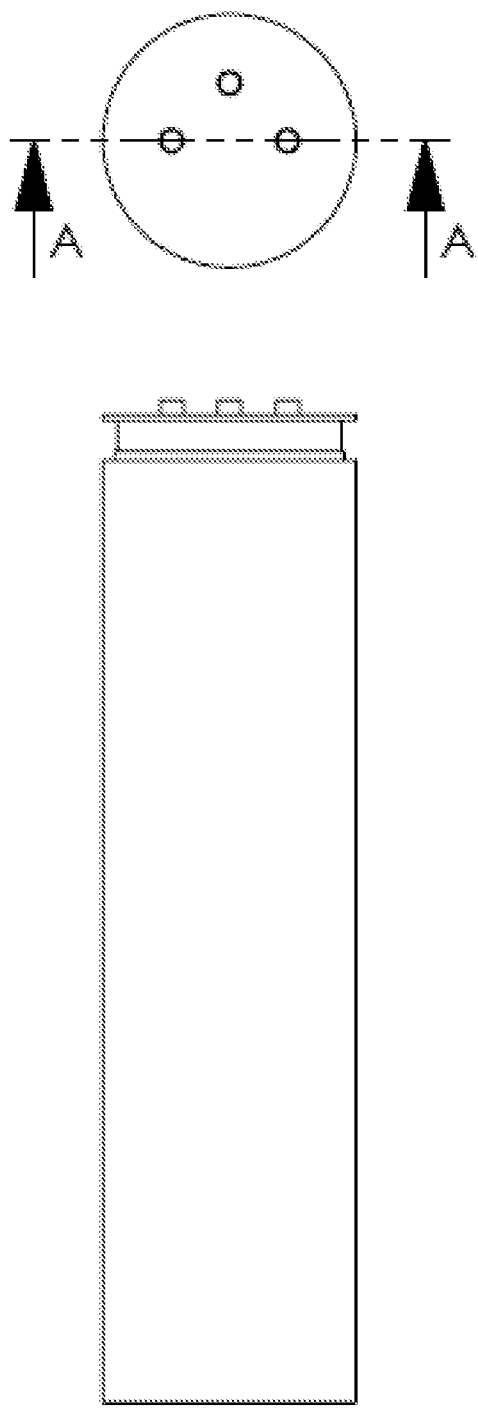
FIG. 1 provides an exemplary embodiment of the presently disclosed devices.

The present disclosure may be understood more readily by reference to the following detailed description of desired embodiments and the examples included herein. In the following specification and the claims that follow, reference will be made to a number of terms which have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

The present disclosure first provides header assemblies. The assemblies suitably comprise a concave cap plug having upper and lower surfaces and a cap having upper and lower surfaces, the cap plug and the cap being sealably assembled to as to define an insulating volume within.

The cap plug may be cylindrical (e.g., can-shaped) in configuration. The cap plug may be concave in configuration or otherwise hollowed or having an opening. It should be understood that the assembly of the cap plug and the cap defines a volume therebetween and that the volume may be of any shape or cross-section.

The insulating volume may be defined by a lower surface of the cap and an upper surface of the cap plug, as shown in FIG. 1 (described in additional detail elsewhere herein). The insulating volume is suitably at a vacuum.

An assembly according to the present disclosure suitably includes at least one cap tube having a lumen, with the lumen of the at least one cap tube extending through an aperture of the cap, through the insulating volume, and through an aperture of the cap plug.

The cap, cap tube, and cap plug suitable comprise metal. Stainless steel is considered especially suitable. The lumen may have a cross-sectional dimension (e.g., a diameter) in the range of from about 0.001 cm to about 10 cm, or from about 0.01 cm to about 1 cm, and any and all intermediate values, e.g., 0.07 cm to about 0.74 cm. These values are exemplary only and are not limiting in any way.

An assembly may further comprise a conductive connector extending through the lumen of the at least one cap tube. Such a connector may be a pin, a wire, a lead, or other conductive material.

A header assembly may also comprise an insulating material disposed within the lumen of the at least one cap tube so as to mechanically fix the conductive connector in position. The insulating material may be a glass (e.g., borosilicate glass), a ceramic, rubber, or other insulating material; glass is considered especially suitable. The insulating material may be present in sufficient volume within the lumen so as to interrupt fluid communication through the lumen. In some embodiments, the insulating material is present so as to seal up the volume within the cap tube that is not occupied by the conducting material.

In some embodiments, the connector does not occupy all of the volume within the lumen. In this way, there is sufficient space for the insulator to fill within the lumen so as to fix the connector in place. The insulating material also acts to seal the assembly against the exterior environment and may even serve as a hermetic seal. The header assembly (and any one or more of its parts) may act as a hermetic seal for a device (or devices) disposed within the interior of a container to which the header is affixed, e.g., sealably affixed.

The cap and cap plug may be affixed (e.g., sealably affixed) to one another by various methods known to those of ordinary skill in the art. For example, they may be affixed by brazing, welding, adhesive, press-fitting, interference fitting, and the like. The header assembly may be fitted to an opening of a container so as to seal the opening of the container, e.g., when the container is can- or bottle-shaped.

The assembly may further comprise a device, e.g., an electronic device, an energy storage device, or any combination thereof disposed within the container. Energy storage devices are considered especially suitable.

The electronic device (or energy storage device) may be in electronic communication with the environment exterior to the header assembly. The electronic communication may be by way of the conductive connector. As one example, a conductive pin that extends through the lumen of the cap tube may be used to place a device sealed within the container into electronic communication with the environment (e.g., another device) exterior to the container or exterior to the header assembly.

The header assembly may be present so as to interrupt fluid communication between the device within the container and the environment exterior to the container, e.g., by plugging an opening or by shielding the interior of the container from the exterior environment. As one example, the assembly may be positioned so as to plug, cover, or otherwise fill an opening of the container. The assembly may act to seal the interior of the container against the environment exterior to the container.

In some embodiments, the container may comprise at least two walls and a sealed vacuum between the at least two walls; the container may also be otherwise insulated, e.g., via an insulating material or by an exterior insulating cladding. Some exemplary vacuum-insulated structures (and related techniques for forming and using such structures) may be found in United States patent application publications 2015/0110548, 2014/0090737, 2012/0090817, 2011/0264084, 2008/0121642, and 2005/0211711, all by A. Reid, and all incorporated herein by reference in their entireties for any and all purposes. It should be understood that a vacuum (i.e., any vacuum within the disclosed devices and methods) may be effected by the methods in the aforementioned applications or by any other method known in the art.

Containers may be of various configurations. Cylindrical containers are considered especially suitable. Straight-wall containers are suitable, but are not required, as sloped-wall containers are also suitable. Squared or otherwise polygonal containers are also suitable. A container may have an aspect ratio in the range of from about 1:100 to about 100:1, in some embodiments. Likewise, a header assembly may have an aspect ratio in the range of from about 1:100 to about 100:1.

A container may have a cross-sectional dimension in the range of from 0.1 cm to about 20 cm, or from about 1 cm or from about 10 cm, or even about 5 cm. Containers having a form factor identical or similar to an AAA, AA, A, C, or even a D battery are all considered suitable. A container may also have a form factor identical or similar to other standard battery sizes in addition to the battery sizes previously mentioned. A container may be cylindrical (as described), cubic, rectangular, or be of other suitable shape.

The present disclosure also provides methods of constructing header assemblies. The methods suitably comprise disposing an electronic device within a container having an opening and affixing a header assembly so as to seal the opening against the environment exterior to the container.

Figure 2:
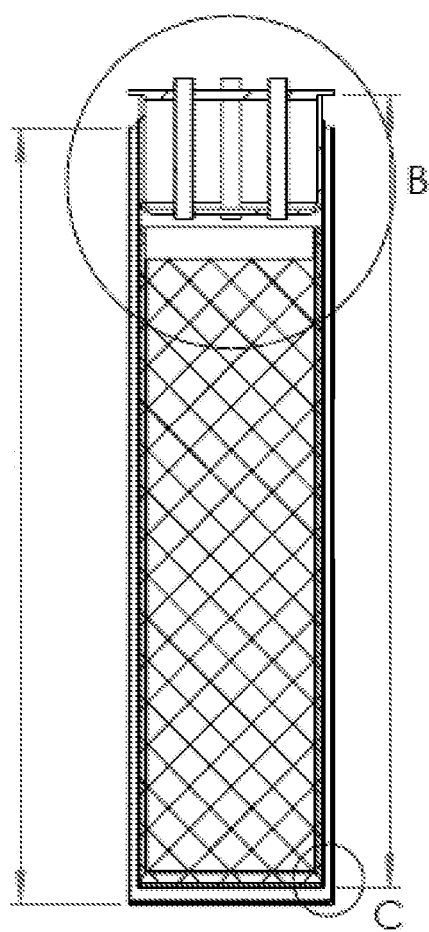
FIG. 2 provides a cutaway view of the embodiment of FIG. 1.

There may be a volume defined within the header assembly, the header assembly comprising a tube having a lumen, the lumen extending through the volume so as to place the interior of the container into fluid communication with the environment exterior to the container, as shown in non-limiting FIG. 2.

A header assembly may include a conductive connector extending through the lumen of the at least one cap tube. Suitable connectors are described elsewhere herein. The conductive connector may place the electronic device into electronic communication with the environment exterior to the container. The volume described herein may be at a vacuum.

The present disclosure also provides methods of forming a header assembly. The methods suitably include joining a cap and a concave cap plug so as to define a header assembly having a first surface, a second surface, and a sealed volume within. The joining may be accomplished by brazing, welding, adhering, or using other methods known to those of skill in the art.

The methods may also include effecting a vacuum within the sealed volume. The vacuum may be accomplished by methods known in the art, e.g., the methods set forth in United States patent application publications 2015/0110548, 2014/0090737, 2012/0090817, 2011/0264084, 2008/0121642, and 2005/0211711, all by A. Reid, and all incorporated herein by reference in their entireties for any and all purposes.

The methods include placing at least one tube having a lumen such that the lumen extends through the sealed volume from the first surface to the second surface so as to place the first and second surfaces into fluid communication with one another. This may be accomplished by inserting the tube into a surface aperture. A user may affix (e.g., sealably affixing) the tube to a surface, e.g., by welding, brazing, adhering, press fitting, and the like.

Methods may also include affixing (e.g., via welding, brazing, adhering, press-fitting, and the like, including sealably affixing) the header assembly to a container having a volume within so as to at least partially seal the volume against the environment exterior to the container. A user may place a device (e.g., an electronic device, an energy storage device) within the volume of the container into electronic communication with the environment exterior to the container. The electronic communication may be effected by a conductive connector within the lumen.

A user may also dispose an insulating material within the lumen of the at least one cap tube so as to mechanically fix the conductive connector in position. Suitable insulating materials are described elsewhere herein; e.g., glass. A container may, as described elsewhere herein, comprise at least two walls and further comprises a sealed vacuum between the at least two walls.

Figure 3:
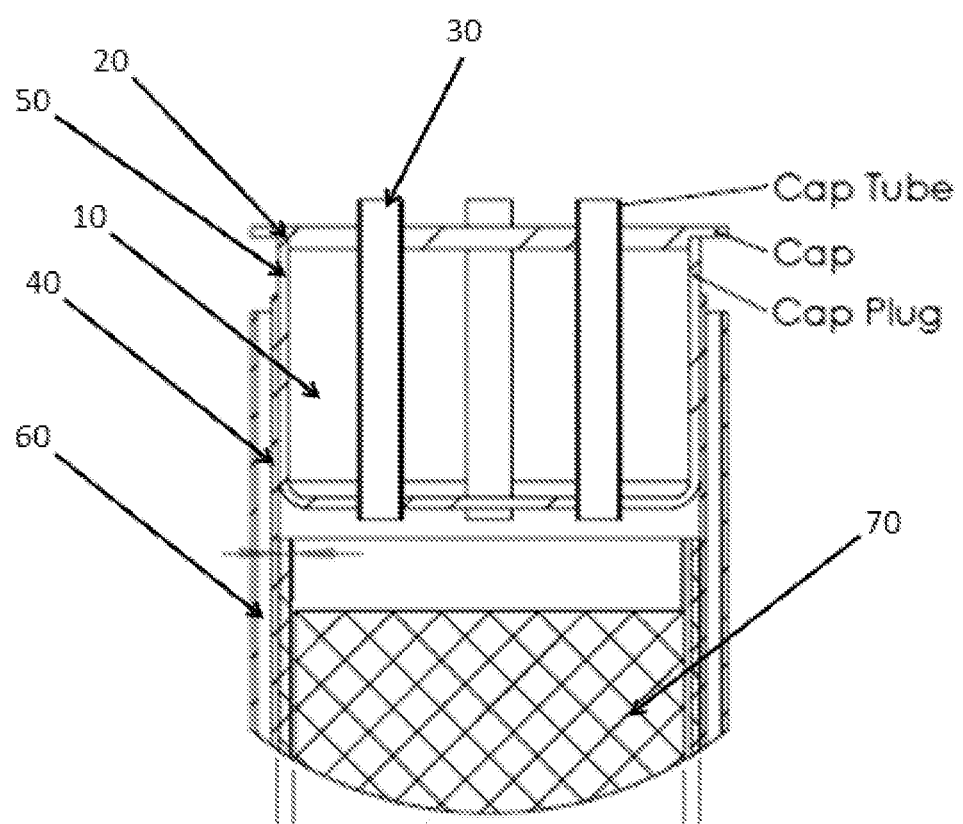
FIG. 3 provides a closer view of a portion of the device of FIG. 2.

An exemplary embodiment is shown in FIG. 3, which is a closer view of the area encircled at the top of FIG. 2. As shown in that figure, cap 20 and cap plug 40 are joined 50 to define volume 10. The cap plug 20 is joined to container 60 to seal container 60. This sealing acts to insulate device 70 from the environment exterior to the container.

A conductive connector (e.g., a pin) (not shown) may extend through cap tube 30 from the environment exterior to the device. The pin may place the device 70 into electronic communication with the exterior environment.

Battery containers according to the present disclosure may also comprise a multiwall vessel comprising inner and outer closed walls, the multiwall vessel defining a volume enclosed within the inner wall, and a region of reduced pressure being disposed between the first and second walls of the multiwall vessel; a conductive cap, the conductive cap being disposed such that at least a portion of the conductive cap resides within the volume enclosed by the inner wall of the vessel, and the conductive cap being sealed to the multiwall vessel, the conductive cap having a region of reduced pressure disposed within the conductive cap, and the conductive cap being disposed within the multiwall vessel so as to engage with a battery cell disposed within the multiwall vessel and place the battery cell into electronic communication with the environment exterior to the battery container.

The region of reduced pressure may be at a pressure of, e.g., from less than about 760 Torr to about $1 \times 10^{-7}$ Torr, or even about $10^{-9}$ Torr. Pressures of from about $10^{-1}$, $10^{-2}$, $10^{-3}$, $10^{-4}$, $10^{-5}$, $10^{-6}$, $10^{-7}$, $10^{-8}$, or even $10^{-9}$ Torr (and all intermediate values between $10^{-1}$ and $10^{-9}$ Torr) are all considered suitable.

A closed wall may be cylindrical in configuration. Such a wall may be circular in cross-section, but may also be oblong (e.g., oval) in cross-section. A wall may also be polygonal in cross-section, e.g., hexagonal in cross-section.

A closed wall is suitably formed of a metal or a metal alloy. Inner and outer walls may be concentric with each other (e.g., coaxial cylinders), but this is not a requirement. The spacing between inner and outer walls may be constant or about constant around the perimeter of the inner wall, but this is not required.

A conductive cap may comprise a metal. The conductive cap may be sealed to the multiwall vessel via methods known to those of ordinary skill in the art, e.g., press-fitting, soldering, welding, sintering, adhering, and the like. The conductive cap may comprise one or more protrusions that extend from a surface of the cap. As one example, the cap may comprise a protrusion sized and shaped so as to allow the battery container to engage with a standard-sized battery compartment of an electronic device.

As another example, the conductive cap may comprise a portion that extends into the volume enclosed within the inner wall and engages with a battery cell disposed within the multiwall vessel. The conductive cap may also comprise an extended portion that extends outwardly from the battery container.

As described above, the conductive cap may comprise within a region of reduced pressure. Without being bound to any particular theory, the region of reduced pressure may act to thermally insulate the contents of the battery container from the environment exterior to the container. The region of reduced pressure may occupy from about 1 to about 99% of the volume of the conductive cap, e.g., from about 10 to about 90%, from about 20 to about 80%, from about 30 to about 70%, from about 40 to about 60%, or even about 50% of the volume of the conductive cap. The conductive cap may be formed from one, two, or more pieces, which pieces may be assembled as needed to achieve the desired final shape and size of the cap.

A battery container according to the present disclosure may further comprise an amount of insulating material disposed so as to seal between the conductive cap and the volume enclosed within the multiwall vessel. The insulating material may be a solid or be porous.

A battery container may also comprise a battery cell disposed within the multiwall vessel. The battery cell may be a commercially-available cell, such as an A, AA, or even a AAA battery cell. A battery cell need not be an elongate cylinder in shape, as a disc- or otherwise-shaped battery cell is also considered suitable.

In some embodiments, battery containers according to the present disclosure may include a resilient member disposed within the multiwall vessel, the member being configured to exert a battery cell disposed within the multiwall vessel toward the conductive cap. Such a resilient member may be, without limitation, a coil spring, a leaf spring, an elastomer, and the like.

Battery containers according to the present disclosure may be configured such that, during operation, the battery container is configured such that the cap comprises the positive terminal of a power cell, and the outer wall comprises the negative terminal of a power cell.

A battery container may also comprise an amount of an insulating material disposed on the outer wall. The insulating material may be solid or porous. Plastic and polymer materials are both considered suitable insulating materials.

The present disclosure provides further battery containers, the containers comprising: a multiwall vessel comprising inner and outer closed walls, the multiwall vessel defining a volume enclosed within the inner wall, and a region of reduced pressure being disposed between the first and second walls of the multiwall vessel; a conductive cap sealed to the multiwall vessel, the conductive cap being disposed such that at least a portion of the conductive cap resides within the volume enclosed by the inner wall of the vessel, the conductive cap having a region of reduced pressure disposed within the conductive cap, and the conductive cap having a lumen formed therethrough, the lumen extending through the region of reduced pressure disposed within the conductive cap, the lumen placing the volume enclosed within the inner wall of the multiwall vessel into fluid communication with the environment exterior to the conductive cap.

A battery container may comprise a battery material disposed within the multiwall vessel. Suitable battery materials include, e.g., electrolytes, Li-ion battery materials, lead-acid battery materials, and the like.

In some embodiments, the lumen of the conductive cap may have a cross-section (e.g., diameter) in the range of from about 0.1 to about 10 mm, e.g., from about 1 to about 5 mm. The lumen may be straight, but may also include one or more curved regions, depending on the needs of the user.

Battery containers may include a conductor extending through the lumen so as to place the volume enclosed within the inner wall of the multiwall vessel into electronic communication with the environment exterior to the conductive cap. The conductor may be a wire, ribbon, or other shape that suitable extends through the lumen. A conductor may be sealed to the lumen such that the volume enclosed within the inner wall of the multiwall vessel lacks fluid communication with the environment exterior to the conductive cap. In this way, the device comprises a sealed, conductive pathway—for the battery material within the battery container—that extends from within the container to the environment exterior to the battery container. The conductor suitably places the battery material into electronic communication with the environment exterior to the battery container. In some embodiments, during operation, the battery container is configured such that the conductor comprises the positive terminal of a power cell, and the outer wall (of the battery container) comprises the negative terminal of a power cell.

Battery containers according to the present disclosure may also comprise: a multiwall vessel comprising inner and outer closed walls, the multiwall vessel defining a volume enclosed within the inner wall, and a region of reduced pressure being disposed between the first and second walls of the multiwall vessel; a conductive cap sealed to the multiwall vessel, the conductive cap being disposed such that at least a portion of the conductive cap resides within the volume enclosed by the inner wall of the vessel, the conductive cap having at least first and second lumens formed therethrough, the lumens extending through the conductive cap, the lumens placing the volume enclosed within the inner wall of the multiwall vessel into fluid communication with the environment exterior to the conductive cap; a first conductor extending through the first lumen and a second conductor extending through the second lumen.

A first conductor may place a battery cell disposed within the volume enclosed within the inner wall into electronic communication with the environment exterior to the battery container. A battery container may be configured such that the first conductor provides an insulated path for electronic communication between the battery cell enclosed within the inner wall and the environment exterior to the battery container. A conductive cap may comprise a region of reduced pressure disposed within, as described elsewhere herein.

In some embodiments, a battery container may include a conductive shim disposed in electronic communication with the battery cell and first conductor. The shim may be metallic or a metal alloy.

In some embodiments, a battery container may include a resilient member disposed within the multiwall vessel, the member being configured to exert a battery cell disposed within the multiwall vessel toward the conductive cap. Suitable such members are described elsewhere herein.

Battery Cell Container

Figure 4A:
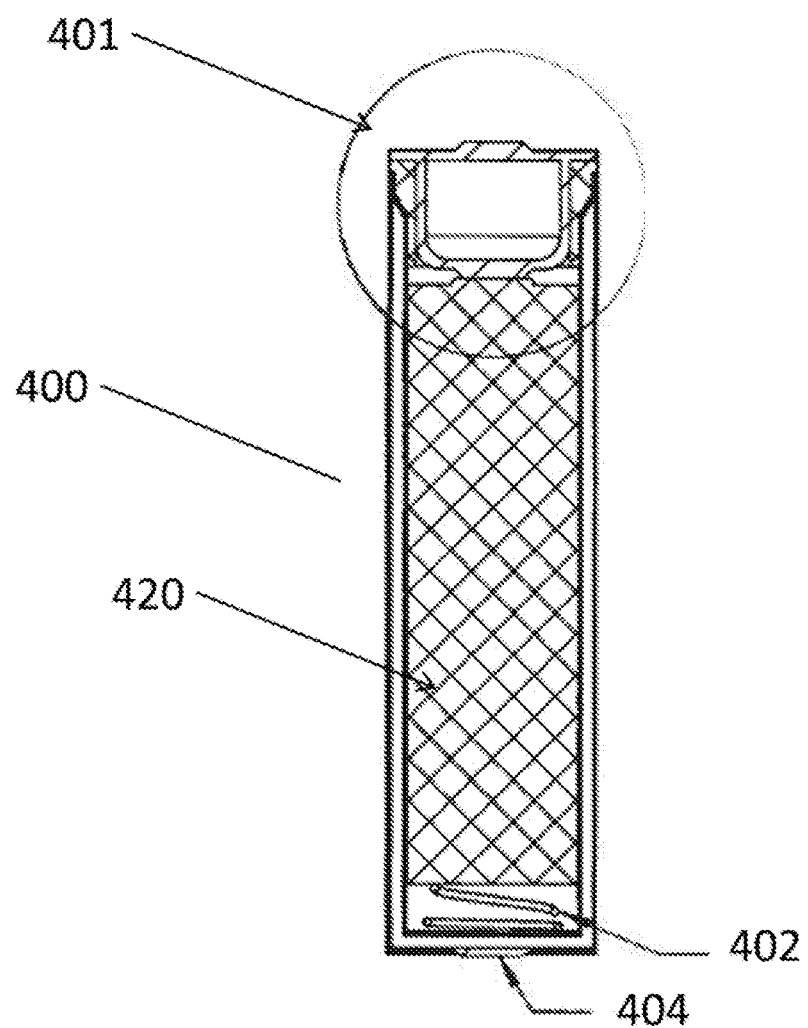
FIG. 4A provides a cutaway view of an exemplary battery container according to the present disclosure.

FIG. 4A provides a further embodiment of the disclosed technology. As shown in that figure, container 400 may include a header portion 401 that may include a positive terminal and also a negative terminal 404. As shown by FIG. 4A, the container may include a spring 404. The spring 404 may be configured so as to maintain battery cell 420 (also shown in FIG. 4B) in the battery cell's proper position. Spring 420 may itself in some embodiments be conductive, so as to place the battery cell into electrical communication with negative terminal 404. (The encircled region nearby to header portion 401 is shown in close-up in FIG. 4B.)

Figure 4B:
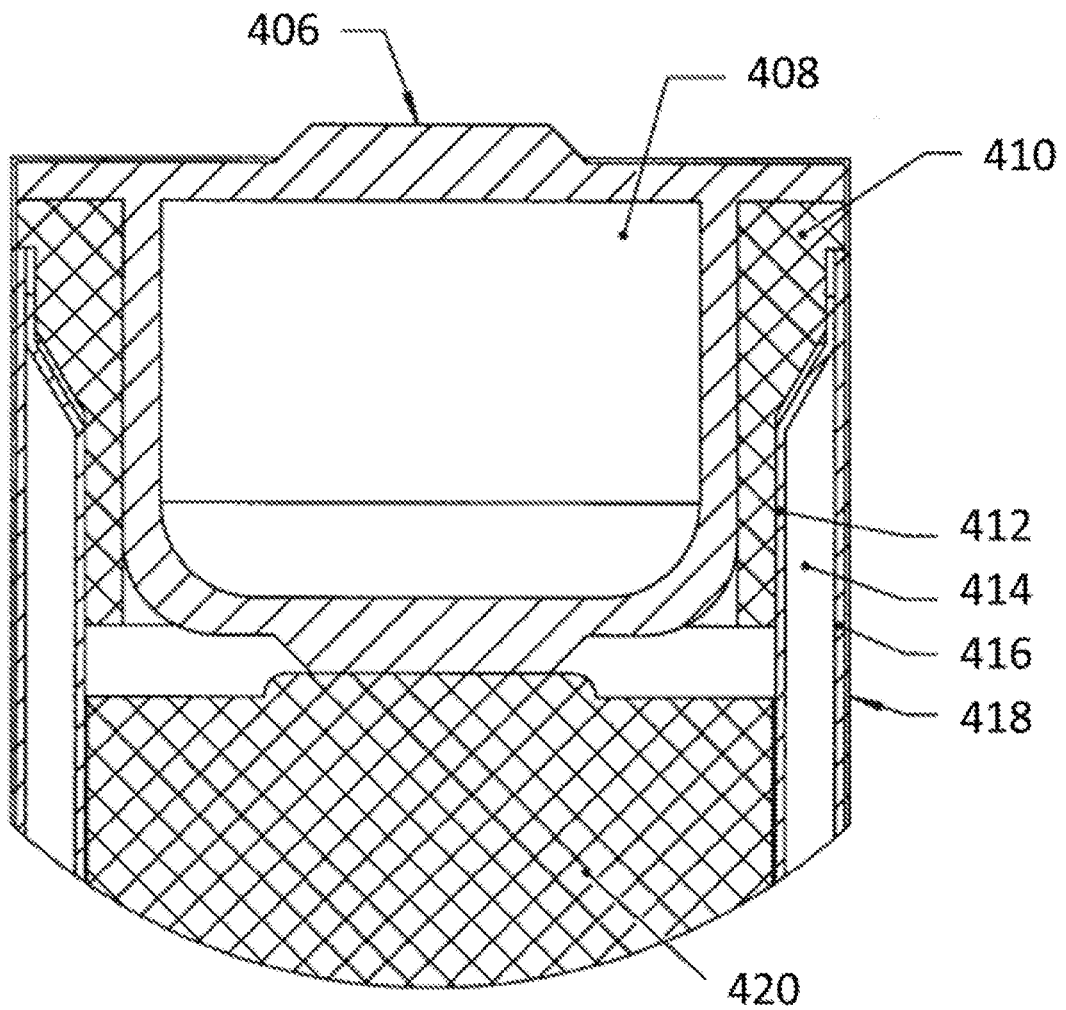
FIG. 4B provides a closer view of the upper region of the battery container of FIG. 4A.

FIG. 4B provides further detail of the header portion of container 400, described in FIG. 4A. As shown in FIG. 4A, the container may suitably include positive terminal 406. As shown, the positive terminal may extend or otherwise protrude from container 400. As is known in the art, an extended positive terminal may be used to engage against a receiver (e.g., a conductor) that is itself a spring or otherwise exerted toward the positive terminal. Such receivers are common in the art and are found, e.g., in toys, remote controls, and other battery-powered devices.

The header portion of container 400 may further comprise a vacuum space 408. The vacuum space 408 may act to provide thermal insulation between the contents of the container (e.g., battery cell 420) and the environment exterior to the container 400. The vacuum space may be formed by various methods known in the art, e.g., evacuation, use of a getter material, and the like. As described elsewhere herein, a vacuum may be accomplished by the methods set forth in United States patent application publications 2015/0110548, 2014/0090737, 2012/0090817, 2011/0264084, 2008/0121642, and 2005/0211711, all by A. Reid, and all incorporated herein by reference in their entireties for any and all purposes.

A header region may include an amount of cap insulation 410. Cap insulation 410 is suitably a dielectric material, e.g., a polymer, a mineral, an oxide, a nitride, an oxynitride, or any combination thereof. The dielectric may be present in solid, foam, particulate, fluid, or even gel form.

The header portion of a container 400 may further comprise an inner can 412. An inner can 412 may be formed of one or more metals. The can may have a wall thickness of from about 0.1 mm to about 1 mm or even about 5 mm, in some embodiments. A can may be cylindrical in form factor, but may also be polygonal, eccentric, oval, or have other form factors according to a user's needs.

A container 400 according to the present disclosure may also include a vacuum space 414 between inner can 412 and outer can 416. The vacuum space may provide thermal, electrical, magnetic, or other shielding for the contents of container 400. Again as described elsewhere herein, a vacuum may be accomplished by the methods set forth in United States patent application publications 2015/0110548, 2014/0090737, 2012/0090817, 2011/0264084, 2008/0121642, and 2005/0211711, all by A. Reid, and all incorporated herein by reference in their entireties for any and all purposes.

In addition to vacuum space 414 formed between inner can 412 and outer can 414, a container 400 may also comprise an exterior insulation 418. The exterior insulation may be, e.g., shrink-wrapped around at least some of the exterior of container 400. The exterior insulation may comprise a foil (e.g., a reflective foil), a fibrous portion (e.g., fiberglass insulation), a form (e.g., a neoprene foam), or other insulating material known to those of ordinary skill in the art.

As shown in FIGS. 4A-4C, a container may have disposed within it one or more battery cells. A battery cell may be a commercially-available cell, e.g., a AAA, AA, A, C, D, or other commercially-available battery, e.g., a 18650 form factor battery. A battery cell disposed within the container may also be a custom or non-commercial battery cell. It should be understood that the disclosed container technology may be adapted to contain virtually any battery cell. The disclosed containers provide thermal and other insulation to their contents (e.g., battery cells). This insulation/protection allows for improved battery life and/or performance, as temperature can affect battery performance.

Battery Cell

Figure 5A:
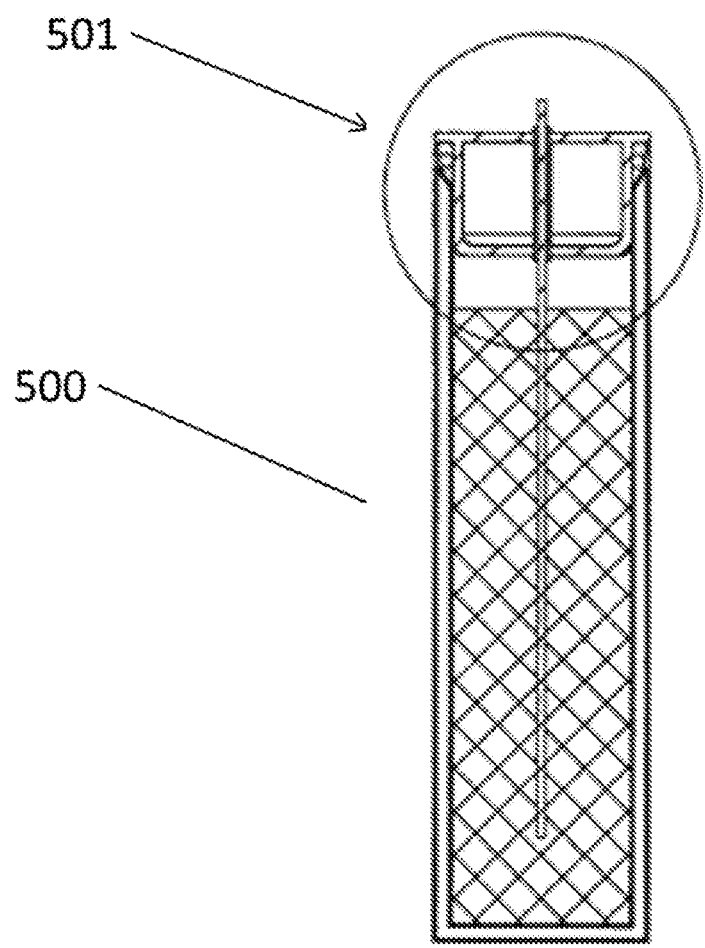
FIG. 5A provides a cutaway view of an alternative exemplary battery container.

FIG. 5A provides a further exemplary embodiment of the disclosed technology. As FIG. 5A shows, a container 500 may include a header portion 501. (The encircled portion nearby to header portion 501 is shown in more detail in FIG. 5B.)

Figure 5B:
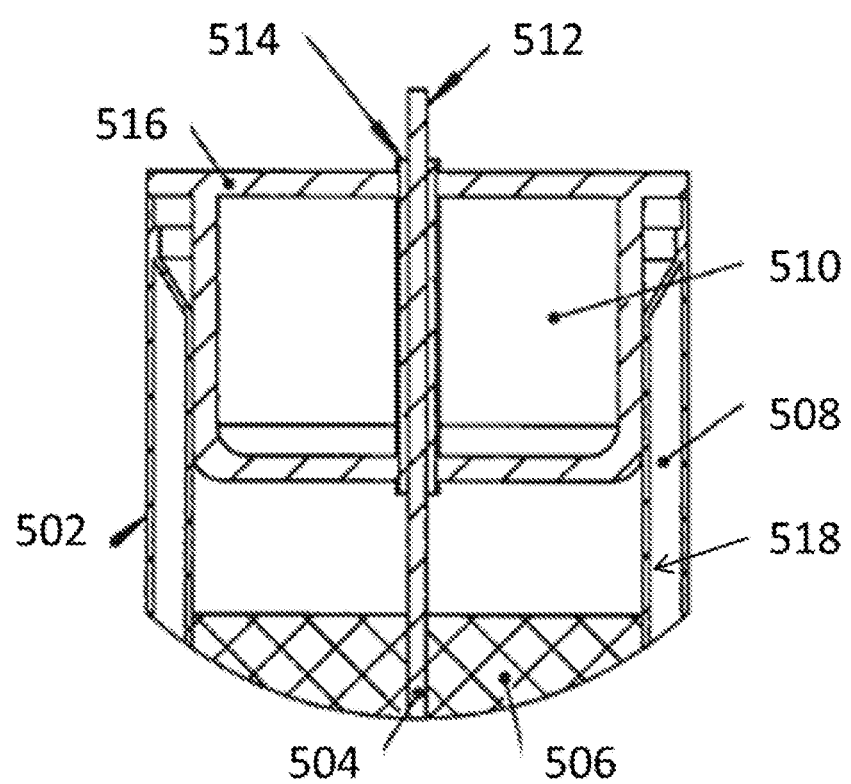
FIG. 5B provides a closer view of the upper region of the battery container of FIG. 5A.

FIG. 5B provides further detail of header portion 501 of container 500. A header portion may comprise an outer can 502, which can may carry a negative charge. (Suitable can materials and specifications are provided elsewhere herein.) A vacuum space 508 may be formed between outer can 502 and inner can 518. Suitable methods of forming a vacuum are described elsewhere herein. The header portion may also include an anode pin 504 (and 512), which pin may comprise a positive charge. The pin 504 may be in electronic communication with battery material 506. Some suitable battery materials include, e.g., lead-acid batteries, Li-ion batteries, and the like.

Pin 512 may extend through vacuum space 510. An insulator 514 may be present to insulate the pin from the vacuum space; the insulator may comprise glass, a polymer, or other dielectric material. The vacuum space 510 may be formed in cap 516, as shown in FIG. 5B. The cap may comprise one or more metals.

Alternative Battery Cell

Figure 6A:
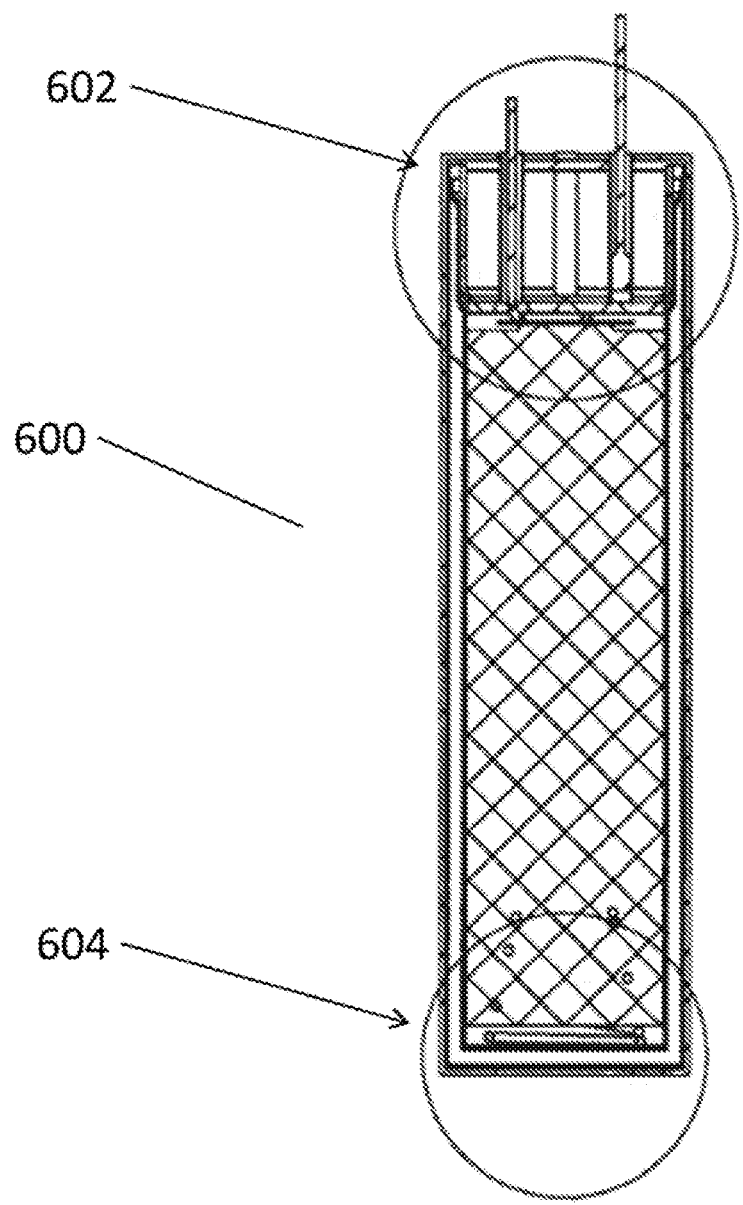
FIG. 6A provides a cutaway view of an alternative exemplary battery container.

FIG. 6A provides a further illustrative embodiment of the disclosed technology. As shown in FIG. 6A, a container 600 may comprise a header region 602 and a bottom region 604. (The encircled portion nearby to header region 602 is shown in more detail in FIG. 6C, and the encircled portion nearby to bottom region 604 is shown in more detail in FIG. 6C.)

Figure 6B:
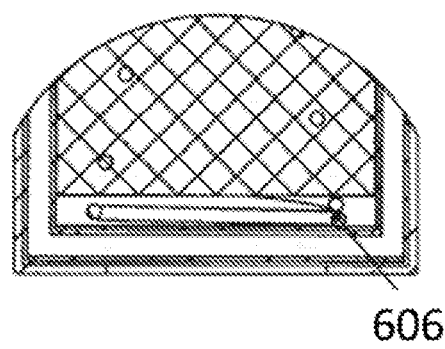
FIG. 6B provides a closer view of the lower region of the battery container of FIG. 6A.

FIG. 6B provides further information concerning bottom region 604. As FIG. 6B shows, container 600 may comprise spring 606, which spring may be configured so as to maintain the contents of the container in a particular position. Spring 606 may itself in some embodiments be conductive, so as to place the contents of the container 600 into electrical communication with a negative terminal, which negative terminal may be comprised within bottom region 604, though this is not a requirement.

Figure 6C:
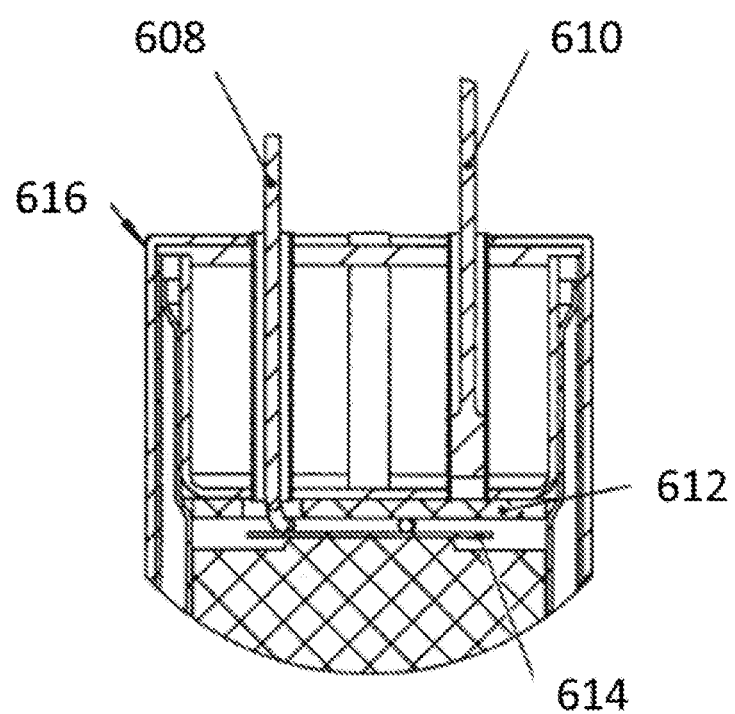
FIG. 6C provides a closer view of the upper region of the battery container of FIG. 6A.

FIG. 6C provides further detail concerning header region 602. As FIG. 6C illustrates, the header region may include a cap (not labeled) through which wires extend. A wire may be bent wire 608; a wire may also be soldered, as shown by soldered wire 610. An insulator 612 may be present; the insulator may be present as a plate, a disc, or other suitable form.

A shim 614 may also be present. The shim may act to maintain a spacing, force, or both between two or more components disposed within container 600. As shown in FIG. 6B, one or more wires may be present between insulator 612 and shim 614. It should be understood that shim 614 is not a requirement and may be present dependent on the needs of the user.

What is claimed:

1. A header assembly, comprising:
    a concave cap plug having upper and lower surfaces;
    a cap having upper and lower surfaces,
        the cap plug and the cap being sealably assembled to as to define an insulating volume within,
        the insulating volume being defined by a lower surface of the cap and an upper surface of the cap plug,
        the insulating volume being at a vacuum;
    at least one cap tube having a lumen, the lumen of the at least one cap tube extending through an aperture of the cap, through the insulating volume, and through an aperture of the cap plug.

2. The header assembly of claim 1, further comprising a conductive connector extending through the lumen of the at least one cap tube.

3. The header assembly of claim 2, further comprising an insulating material disposed within the lumen of the at least one cap tube so as to mechanically fix the conductive connector in position.

4. The header assembly of claim 3, wherein the insulating material occupies sufficient volume within the lumen so as to interrupt fluid communication through the lumen.

5. The header assembly of claim 1, further comprising an electronic device, an energy storage device, or any combination thereof disposed within a container sealably engaged with the header assembly.

6. The header assembly of claim 5, wherein the electronic device or energy storage device is in electronic communication with the environment exterior to the header assembly.

7. The header assembly of claim 5, wherein the header assembly interrupts fluid communication between the device within the container and the environment exterior to the container.

8. The header assembly of any claim 5, wherein the container comprises at least two walls and a sealed vacuum between the at least two walls.

9. The header assembly of claim 3, wherein the insulating material comprises a glass.

10. The header assembly of claim 2, wherein the conductive connector comprises a wire, a pin, a lead, or any combination thereof.

11. The header assembly of claim 1, wherein the cap and the cap plug are brazed to one another.

12. The header assembly of claim 1, wherein the header assembly is fitted to an opening of a container so as to seal the opening of the container.

13. The header assembly of claim 12, wherein the container is characterized as being cylindrical.

14. The header assembly of claim 12, wherein the header assembly is affixed to the opening of the container.

15. The header assembly of claim 12, wherein the container defines inner and outer closed walls, the container defining a volume enclosed within the inner wall, and the container further defining a region of reduced pressure being disposed between the first and second walls of the container.

16. The header assembly of claim 1, wherein the insulating volume is at a pressure of from less than 760 Torr to about $1 \times 10^{-7}$ Torr.

17. The header assembly of claim 5, comprising an electronic device disposed within the container sealably engaged with the header assembly.

18. The header assembly of claim 5, comprising an energy storage device disposed within the container sealably engaged with the header assembly.

19. The header assembly of claim 12, wherein the header assembly and container define a form factor identical to a AAA, AA, A, C, or D battery.

20. The header assembly of claim 12, wherein the container is characterized as being polygonal.

* * * * *